G. H. TAYLOR.
SEAL.
APPLICATION FILED OCT. 8, 1915.

1,192,243.

Patented July 25, 1916.

Witnesses
R. E. Rousseau
L. R. Fiedler

Inventor
George H. Taylor.
By Alfred T. Gage
Attorney

UNITED STATES PATENT OFFICE.

GEORGE H. TAYLOR, OF RICHMOND, VIRGINIA.

SEAL.

1,192,243.

Specification of Letters Patent.

Patented July 25, 1916.

Application filed October 8, 1915. Serial No. 54,746.

*To all whom it may concern:*

Be it known that I, GEORGE H. TAYLOR, a citizen of the United States, residing at Richmond, in the county of Henrico and State of Virginia, have invented certain new and useful Improvements in Seals, of which the following is a specification.

This invention relates to a seal and particularly to a construction in which the seal is broken or separated from the retaining strip or member if any attempt be made to remove the seal.

The invention has for an object to provide a strip of bendable material adapted to be folded upon itself when applied and provided with a weakened portion parallel to and adjacent the line upon which said strip is bent.

Other and further objects and advantages of the invention will be hereinafter set forth and the novel features thereof defined by the appended claims.

Figure 1:
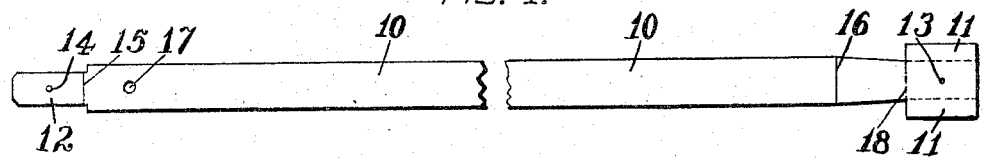
Figure 2:
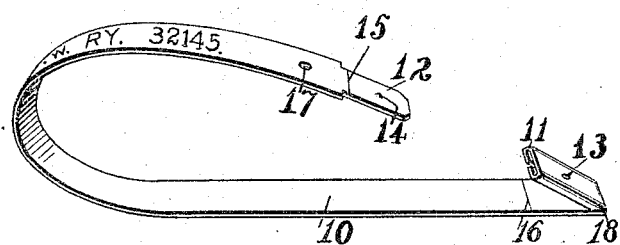
Figure 3:
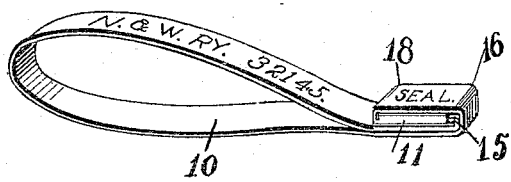
Figure 4:
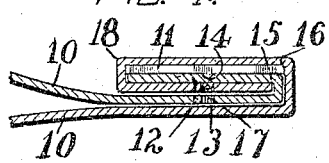

In the drawing Figure 1 is a plan of the blank; Fig. 2 is a perspective of the seal before insertion in the retaining member; Fig. 3 is a perspective of the completed seal; and Fig. 4 is an enlarged section through the folded seal.

Like numerals of reference refer to like parts in the several figures of the drawing.

The numeral 10 represents the seal strip which may be of any desired material or configuration, preferably of bendable metal. This strip is provided at one end with the flanges 11 which are adapted to be bent inward, as shown in Fig. 2, to form a socket for the opposite end 12 of the strip. The socket portion is provided with a recess 13 adapted to receive the projection 14 upon the free end 12 of the strip. This connection is not a seal or locking connection but merely to adjust the parts in accurate position so that the weakened lines will lie parallel to and at one side of the fold lines. These weakened lines are provided adjacent the free end of the strip as shown at 15 and also adjacent the bend line 18 at the socket end of the strip as shown at 16. The strip may also be formed with a stringing recess 17. The infolded portions which form the socket end of the strip provide a bending support over which the strip may be folded and the break line being at one side of said bend is not liable to cause a breaking of the strip in applying the seal which would occur if the weakened lines were disposed upon the fold or bend lines thereof.

In the application of the device, the free end of the strip is inserted in the socket until the projection upon the free end thereof seats in the recess of the socket end which properly adjusts the weakened lines relative to the bend lines. The socket end of the seal is then bent upon the body of the strip as shown in Fig. 3 which brings the weakened lines 15 and 16 practically into conjunction so that if any attempt is made to remove, open or tamper with the seal, it is broken from the strip, leaving the ends thereof free so that they may be readily detected by an inspector and absolutely preventing any restoring of the seal to its original condition.

While I have described the specific construction of the seal, this invention is not confined thereto but may be applied to any tag or marking device wherein the parts of the device are bent upon each other in such manner as to leave the weakened portion unaffected by the bending action.

What is claimed is—

1. A seal comprising a strip of bendable material having the opposite ends thereof placed in contact and both ends then bent backward upon the body of the strip to form a seal, each end being provided with a weakened portion adjacent the outer edge of the bent portions to effect separation thereof from the body of the strip.

2. A seal comprising a strip of bendable material having the opposite ends thereof placed in contact and both ends then bent backward upon the body of the strip to form a seal, each end being provided with a weakened portion disposed parallel to and adjacent the outer edge of the bent portions.

3. A seal formed of a strip of bendable material having a socket portion at one end to receive the opposite inserted end thereof, said portion and inserted end being folded backward upon the body of the material for the length thereof and provided with a weakened line adjacent the outer edge of the folded portion to effect the separation thereof from said body.

4. A seal comprising a strip having at one end flanges adapted to be bent inward to form a socket portion thereon to receive the opposite end of said strip, said socket portion and inserted end being bodily bent upon said strip for the length thereof.

5. A seal comprising a strip having at one end flanges adapted to be bent inward to form a socket portion thereon to receive the opposite end of said strip, said socket portion and inserted end being bodily bent upon said strip for the length thereof, and having weakened lines parallel the fold line which connects the socket portion to the strip and the inserted end thereof.

6. In a seal, a strip having opposite flanges at one end adapted to be bent inward to form a socket to receive the opposite end of the strip, said socket after assemblage being bodily bent upon the body of the strip, and a weakened line on said strip spaced from the final bend line at the inner end of said socket.

7. In a seal, a strip having opposite flanges at one end and a centrally disposed recess intermediate thereof, said flanges being adapted to be bent inward to form a socket to receive the opposite end of the strip, a gaging projection upon said end adapted to seat in said recess and weakened portions disposed adjacent a fold line at the inner end of said socket and opposite end of the strip.

8. A seal comprising a strip of bendable material having at one end a socket portion adapted to receive the opposite end of the strip and to be bent backward upon the body of the strip, and provided with a weakened line in the material of the strip spaced inward from the inner end of the socket at a distance equal to the length thereof, and means for gaging the position of said line relative to one end of said socket portion when the inserted end of the seal is applied to the socket.

9. A seal comprising a strip of bendable material having at one end a receiving portion bent backward thereon at an angle to the strip to receive the opposite end of said strip, said free end and receiving portion being further jointly bent backward upon said strip toward the center thereof.

10. A blank for a seal comprising a strip of bendable material having a widened portion at one end with an intermediate recess and weakened portions spaced inward from the inner end of said widened portion and also inward from the opposite end of the strip, and a projection at said opposite end disposed to seat within said recess.

In testimony whereof I affix my signature in the presence of two witnesses.

GEORGE H. TAYLOR.

Witnesses:
E. L. WORD,
T. ROY GRUBBS.

Copies of this patent may be obtained for five cents each, by addressing the "Commissioner of Patents, Washington, D. C."